United States Patent
Kasai et al.

(10) Patent No.: US 7,583,749 B2
(45) Date of Patent: Sep. 1, 2009

(54) DIGITAL DATA TRANSMITTING APPARATUS

(75) Inventors: Yuji Kasai, Tsukuba (JP); Masahiro Murakawa, Tsukuba (JP); Tetsuya Higuchi, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 599 days.

(21) Appl. No.: 10/569,274

(22) PCT Filed: Sep. 7, 2004

(86) PCT No.: PCT/JP2004/012970

§ 371 (c)(1),
(2), (4) Date: Feb. 23, 2006

(87) PCT Pub. No.: WO2005/027368

PCT Pub. Date: Mar. 24, 2005

(65) Prior Publication Data

US 2006/0274850 A1 Dec. 7, 2006

(30) Foreign Application Priority Data

Sep. 10, 2003 (JP) ............................. 2003-317638

(51) Int. Cl.
*H04L 25/49* (2006.01)
(52) U.S. Cl. ........................ 375/294; 324/202
(58) Field of Classification Search ................. 375/294, 375/286, 376, 344, 345, 219, 221; 324/202, 324/244, 251
See application file for complete search history.

(56) References Cited

U.S. PATENT DOCUMENTS

| 7,042,965 B2 * | 5/2006 | Katta et al. ................. 375/345 |
| 7,336,068 B2 * | 2/2008 | Muller ....................... 324/202 |
| 2004/0086063 A1 * | 5/2004 | Cho ........................... 375/344 |

FOREIGN PATENT DOCUMENTS

| JP | 61-288629 | 12/1986 |
| JP | 62-137935 | 6/1987 |
| JP | 63-274224 | 11/1988 |
| JP | 04-158637 | 6/1992 |
| JP | 05-090996 | 4/1993 |
| JP | 05-244037 | 9/1993 |
| JP | 2002-300091 | 10/2002 |

* cited by examiner

*Primary Examiner*—Khai Tran

(57) ABSTRACT

A transmitting circuit 10 converts transmission data to a multilevel analog signal suitable for transmission. The multilevel analog signal is output to a cable 21 via an amplifier and a hybrid circuit 12. In the transmitting circuit 10, a waveform which compensates waveform deterioration at the cable 21 is generated. A reception signal from the cable 21 is input to a mixer 14 via the hybrid circuit 12 and an amplifier 13. The mixer 14 mixes the reception signal and a cancel signal output from a cancel signal generation circuit 17 so as to remove undesired signals. In a receiving circuit 15, the signal output from the mixer 14 is sampled by use of a plurality of sample-hold circuits, and subjected to analog sum-of-product computation which is performed by a matrix circuit for distortion compensation. Subsequently, the sampled signals are converted to digital signals. The digital signals are collectively subjected to processing such as parallel-serial conversion, whereby reception data and an evaluation signal are obtained. An adjustment control circuit 18 includes a CPU, and adjusts the respective circuits on the basis of the evaluation signal such that data can be correctly transmitted and received.

5 Claims, 12 Drawing Sheets

DIGITAL DATA TRANSMITTING APPARATUS

This application claims the benefit of PCT International Application Number PCT/JP2004/012970 filed Sep. 7, 2004 and Japanese Application No. 2003-317638, filed Sep. 10, 2003, in Japan, the disclosures of which are incorporated herein by reference.

TECHNICAL FIELD

The present invention relates to an apparatus for transmitting digital data via a signal cable. In particular, the present invention relates to a transmission apparatus suitable for data transmission at high speed of 1 giga bits per sec or higher.

BACKGROUND ART

In general, in a hybrid circuit, which is used in the case where digital data are transmitted by use of a signal cable for bidirectional communications, a transmission signal and a reception signal are separated from each other by means of a high-frequency transformer. Moreover, when a signal is transmitted through a cable, the signal waveform deteriorates considerably. Therefore, a digital signal processing (DSP) technique has been conventionally used in order to obtain accurate reception data.

In a conventional digital data transmission apparatus as described above, the highest communication speed is 250 mega bits per sec per communication channel, as in the case of a 1000 mega-bit ethernet as disclosed in the following Non-Patent Document 1. Therefore, high-speed data transmission of 1 giga bits per sec per communication channel or higher has been impossible.

The reasons for the impossibility of high-speed data transmission of 1 giga bits per sec or higher are as follows. That is, at frequencies of signals used for high-speed communications, signal separation by use of a high-frequency transformer is very difficult; and an analog-digital converter (A/D converter) and a digital processing circuit, which are used for digital signal processing (DSP), are not practical in terms of operation speed, circuit size, power consumption, and cost.
Non-Patent Document 1: IEEE802.3ab Specifications http://grouper.ieee.org/groups/802/3/ab/

DISCLOSURE OF THE INVENTION

Problems to be Solved by the Invention

An object of the present invention is to solve the above-described problems of the conventional technique and to provide a high-speed data transmission apparatus capable having a transmission speed of 1 giga bits per sec per communication channel or higher.

Means for Solving the Problems

The present invention provides a digital data transmission apparatus of a multilevel transmission scheme, comprising transmitting means including an adjustable preemphasis circuit; receiving means including evaluation-signal generation means for generating an evaluation signal regarding an adjusted condition from a received signal; and adjustment means for adjusting the receiving means or transmitting means of a counterpart apparatus by use of the evaluation signal.

The digital data transmission apparatus may further comprise a hybrid circuit which can perform balance adjustment by means of a resistor matrix circuit; and the receiving means may further include an adjustable echo cancel circuit.

In the digital data transmission apparatus, the evaluation-signal generation means may be configured to determine whether the level of the received signal is in the vicinity of the center of a corresponding one of determination ranges corresponding to multi levels or in the vicinity of a boundary thereof and output histogram information representing its frequency; and the adjustment means may adjust a preemphasis circuit of the counterpart apparatus. In the digital data transmission apparatus, the adjustment means may adjust the respective circuits by means of a genetic algorithm.

In the digital data transmission apparatus, the receiving means may further include an adjustable distortion elimination circuit which performs analog processing for the received signal. In the digital data transmission apparatus, the receiving means may further include a clock regeneration circuit in which a voltage-controlled variable crystal oscillation circuit is used as a voltage-controlled oscillator of a phase-locked loop circuit.

DESCRIPTION OF REFERENCE NUMERALS

Figure 1:
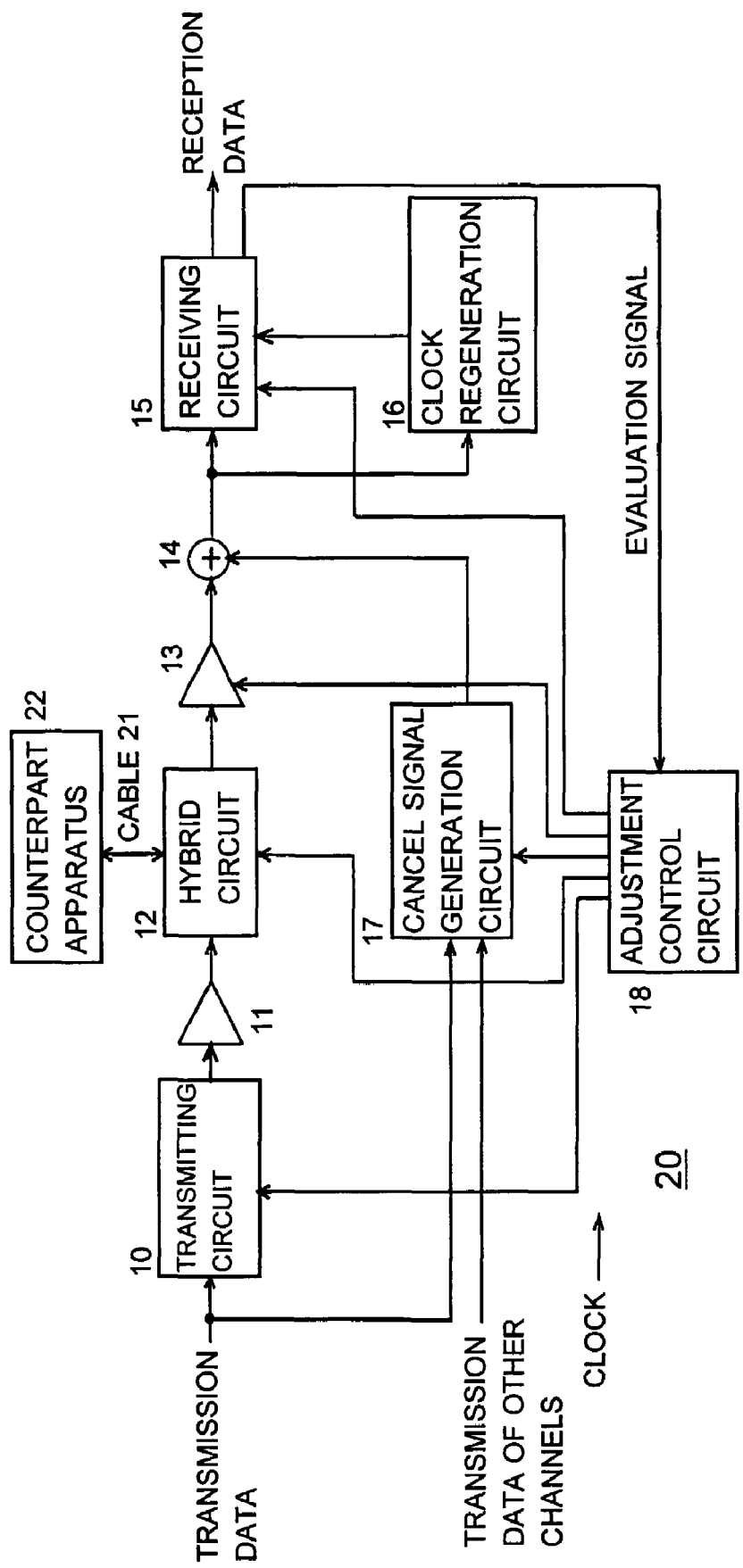
[FIG. 1] Block diagram showing the configuration of a full-duplex transmitting receiving circuit of the present invention.

10: transmitting circuit
11, 13: amplifier
12: hybrid circuit
21: cable
22: counterpart apparatus
14: adder
15: receiving circuit
16: clock regeneration circuit
17: cancel signal generation circuit
18: adjustment control circuit

BEST MODE FOR CARRYING OUT THE INVENTION

A digital data transmission apparatus which can perform full-duplex transmission at a total speed of 10 giga bits per sec (Gbps) in a pulse amplitude modulation (PAM) scheme by use of four coaxial cables will next be described.

Embodiment 1

Figure 2:
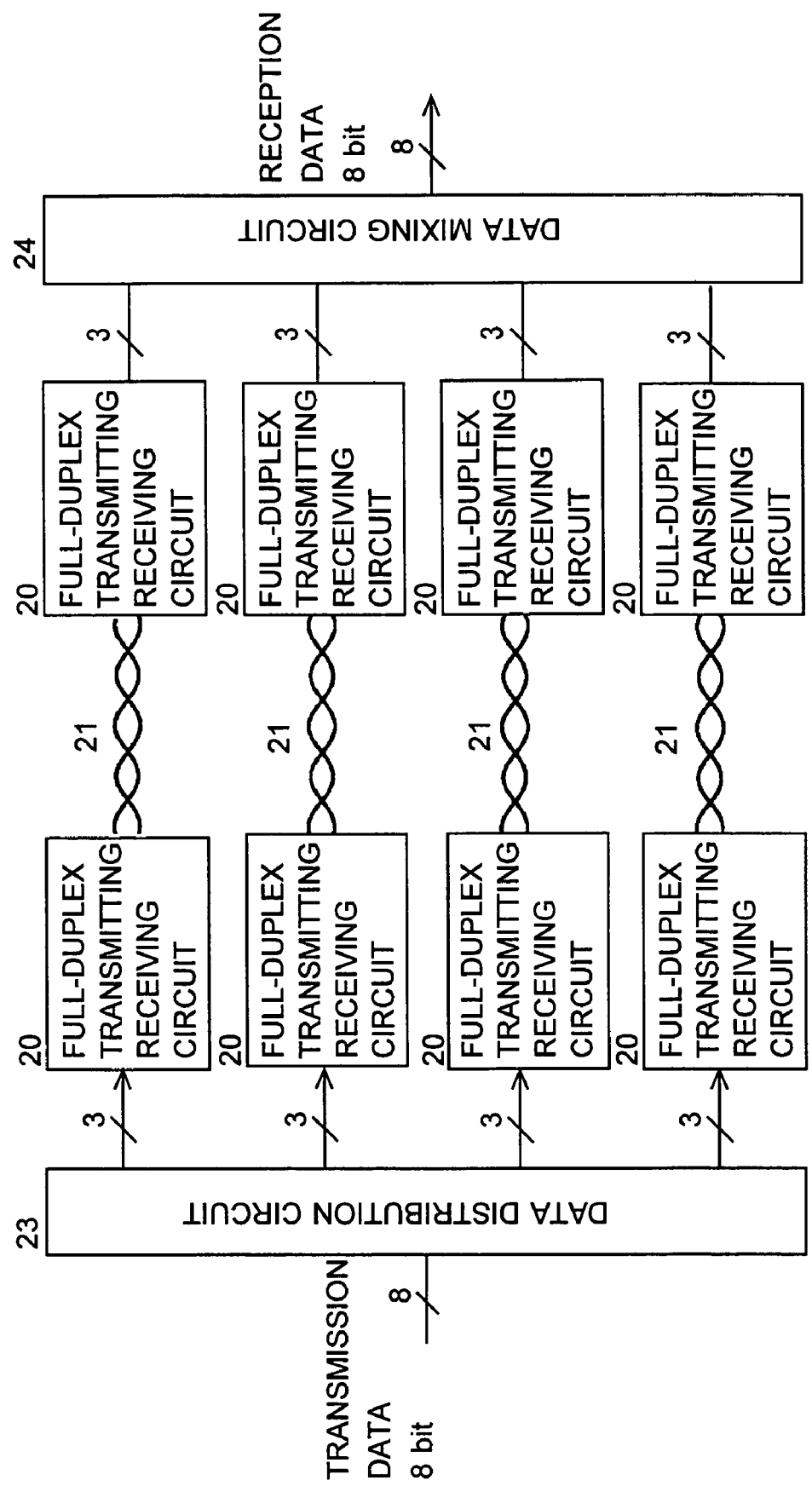
[FIG. 2] Block diagram showing the configuration of an entire transmission apparatus of the present invention.

An embodiment of the present invention will now be described in details. FIG. 1 is a block diagram showing the configuration of a full-duplex transmitting receiving circuit 20 of the present invention. FIG. 2 is a block diagram showing the configuration of an entire transmission apparatus of the present invention. This apparatus transmits digital data, which are mainly handled in a computer, to another computer, an external device, a network, or the like.

The transmission apparatus of the present invention is connected, via a cable 21, with a counterpart transmission apparatus 22 having the same configuration. In the present invention, the cable 21 preferably has a coaxial structure rather than a twist-pair wire structure. For transmission of a plurality of (e.g., 4) channels, a composite coaxial cable in which a plurality of coaxial cables are bound is preferably used. In this case, no problem arises even when the outer conductor of each coaxial cable comes into contact with the outer conductors of other, co-bound coaxial cables. In this case, the outer diameter of the composite coaxial cable can be reduced.

The transmission apparatus includes four full-duplex transmitting receiving circuits 20, a data distribution circuit 23, and a data mixing circuit 24. The data distribution circuit 23 divides transmission data into data segments of, for example, 8-bit length, and converts them to data segments each including 12 bits in total and composed of four 3-bit data segments which correspond to four-channel, five-level pluses and for which error detection correction is possible, and distributes corresponding three bits of each 12-data segment to each of the four full-duplex transmitting receiving circuits 20. The data mixing circuit 24 reproduces the original 8-bit data segments from the 12-bit data segments each composed of four 3-bit data segments corresponding to four-channel, five-level pluses. Notably, the number of transmission levels in multilevel transmission is not limited to 5, and the number of levels may be 8 or 12.

The configuration of each full-duplex transmitting receiving circuit 20 will now be described. Transmission data are converted by a transmitting circuit 10 to a multilevel analog signal suitable for transmission. The multilevel analog signal is amplified by means of an amplifier 11 to a level suitable for transmission, and then output to the cable 21 via a hybrid circuit 12. In the transmitting circuit 10, a waveform which compensates waveform deterioration at the cable 21 is generated in a manner described below.

A portion of the transmission signal becomes an undesired signal called "echo" because of reflection at a connection point or the like present on the cable 21. For accurate data transmission, such an undesired signal must be properly removed. A reception signal from the cable 21 is separated from the transmission signal by means of the hybrid circuit 12, and is fed to an amplifier 13. A cancel signal generation circuit 17 generates, from the transmission data, a cancel signal for eliminating the undesired signal.

The reception signal output from the amplifier 13 and the cancel signal output from the cancel signal generation circuit 17 are mixed by means of a mixer 14, whereby the undesired signal is removed. As will be described in detail, in the receiving circuit 15, the output signal of the mixer 14 is sampled by use of a plurality of sample-hold circuits, and analog sum-of-product computation is performed by a matrix circuit so as to correct distortion. The thus-obtained distortion-free analog signals are converted to digital signals by use of analog-digital converters. The thus-obtained digital signals are collectively subjected to processing such as parallel-serial conversion in a logic circuit. Thus, reception data and an evaluation signal to be described later are obtained.

For determining timings of the above-described series of operations, a clock regeneration circuit 16 extracts a clock signal, from which various timing signals are generated. An adjustment control circuit 18 includes a CPU, and adjusts the respective circuits on the basis of the evaluation signal such that data can be correctly transmitted and received, as will be described in detail.

Notably, the transmission line 21 may be used as a unidirectional transmission line rather than a full-duplex transmission line. In this case, the output of the amplifier 11 is connected directly to a cable 21 for transmission, and a cable 21 for reception is connected to the amplifier 13. The hybrid circuit 12, the cancel signal generation circuit 17, and the mixer 14 become unnecessary.

Figure 3:
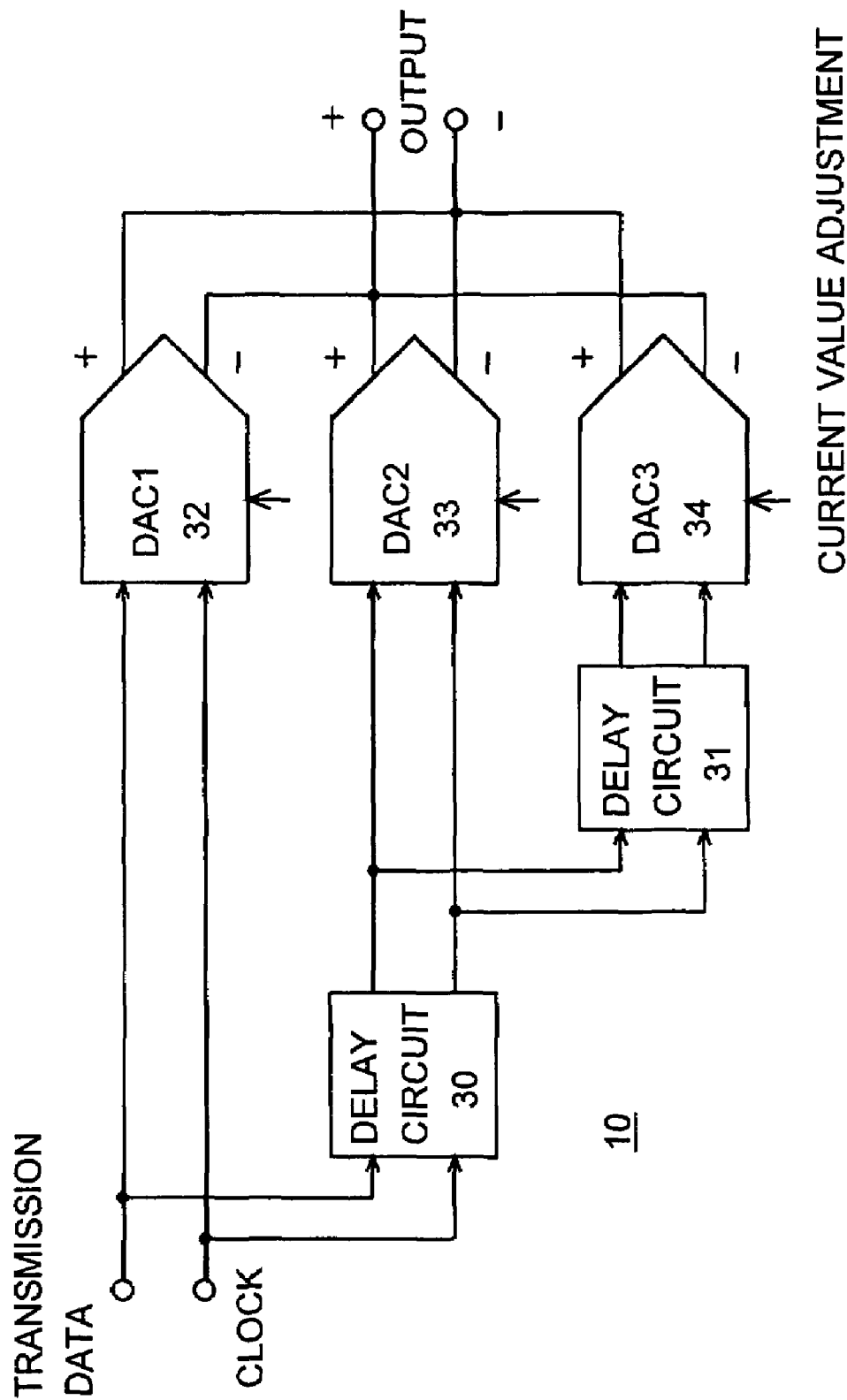
[FIG. 3] Block diagram showing the configuration of a transmitting circuit of the present invention.

FIG. 3 is a block diagram showing the configuration of the transmitting circuit 10 of the present invention. D/A converters DAC1 (32) to DAC3 (34) are of a differential current output type. The outputs of the D/A converters DAC1 to DAC3 are connected in parallel such that the polarities of the outputs of the D/A converter DAC1 become reverse to those of the outputs of the D/A converter DAC3 and equal to those of the outputs of the D/A converter DAC2. Transmission data and a clock signal are fed to the D/A converter DAC1 as they are. The transmission data and the clock signal are fed to the D/A converter DAC2 with a delay of a predetermined time (Td1) produced by a delay circuit 30. The transmission data and the clock signal are fed to the D/A converter DAC3 with a delay of a predetermined time (Td1+Td2) produced by the delay circuit 30 and a delay circuit 31. Notably, the Td1 and Td2 may be adjusted by means of the adjustment control circuit 18.

Figure 7:
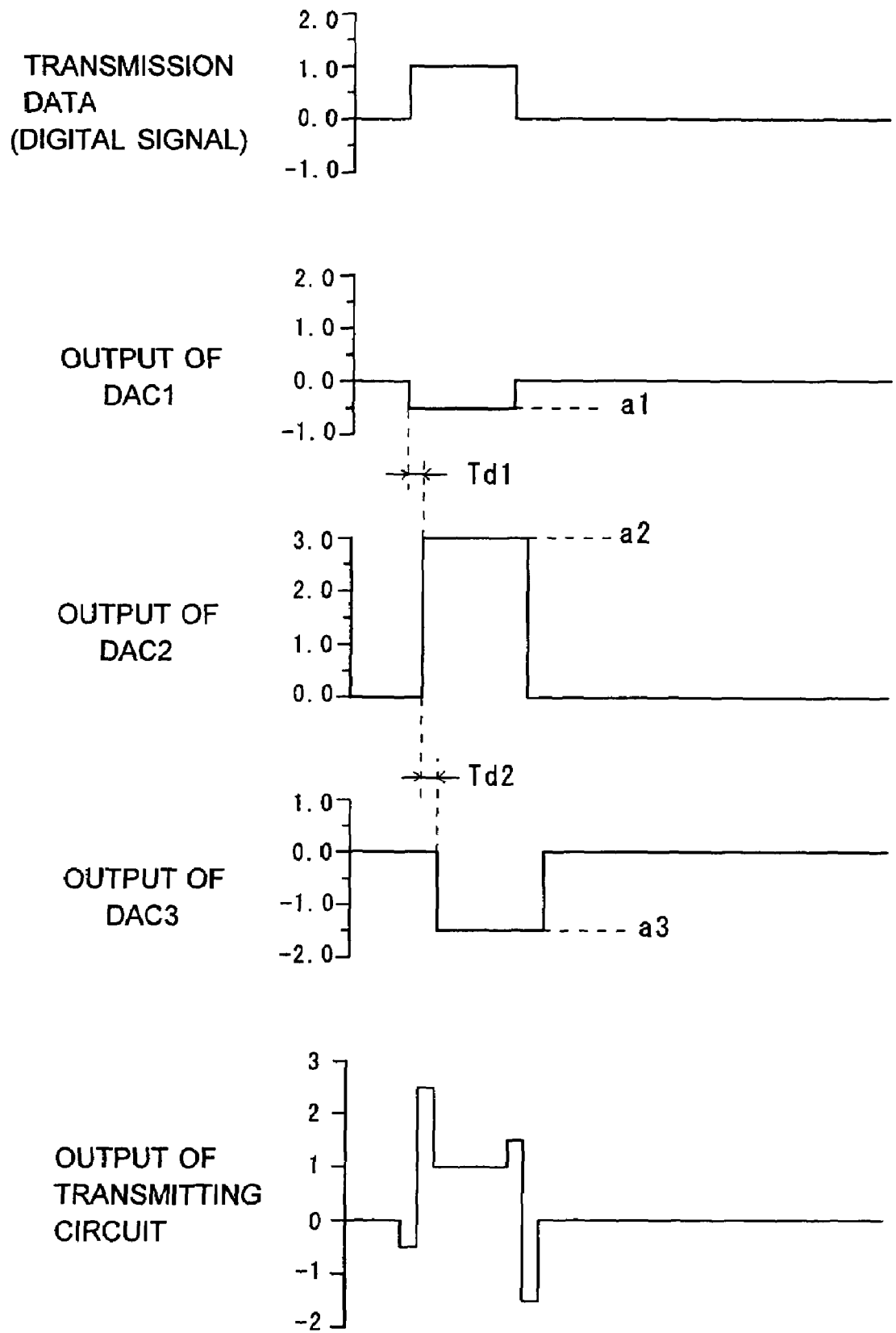
[FIG. 7] Waveform charts showing waveforms observed in the transmitting circuit 10 for the case of a single pulse.
Figure 8:
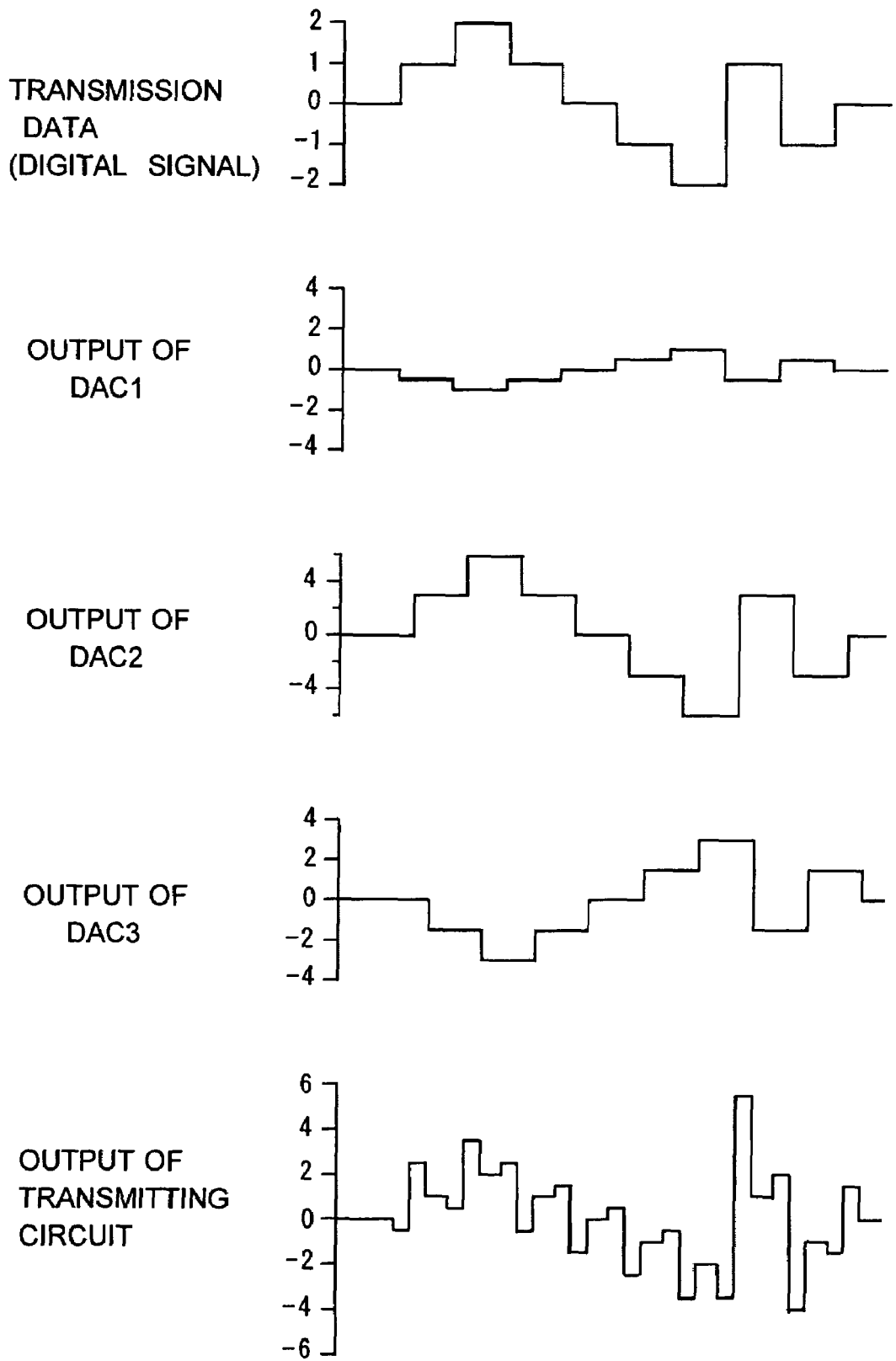
[FIG. 8] Waveform charts showing waveforms observed in the transmitting circuit 10 for the case of continuous data transmission.

FIG. 7 is a set of waveform charts showing waveforms observed in the transmitting circuit 10 in the case where a single pulse is transmitted. FIG. 8 is a set of waveform charts showing waveforms observed in the transmitting circuit 10 in the case where continuous data are transmitted. The waveforms in each set show transmission data (digital data), the outputs (current values) of the DAC1 to DAC3, and the output (current value) of the transmitting circuit 10, respectively (all the waveforms were obtained through a computer simulation). The DAC1 to DAC3 are configured such that the magnification of output current can be varied through variation of their bias currents. When the output currents of the DAC1 to DAC3 are assumed to be at levels a1, a2, and a3, respectively, when the transmission data are "1," the output waveform of the transmitting circuit 10 becomes a preemphasis waveform as shown in the lowest section of FIG. 7. The values of a1, a2, and a3 are adjusted by means of the adjustment control circuit 18 such that a preemphasis waveform suitable for the cable is obtained.

Figure 4:
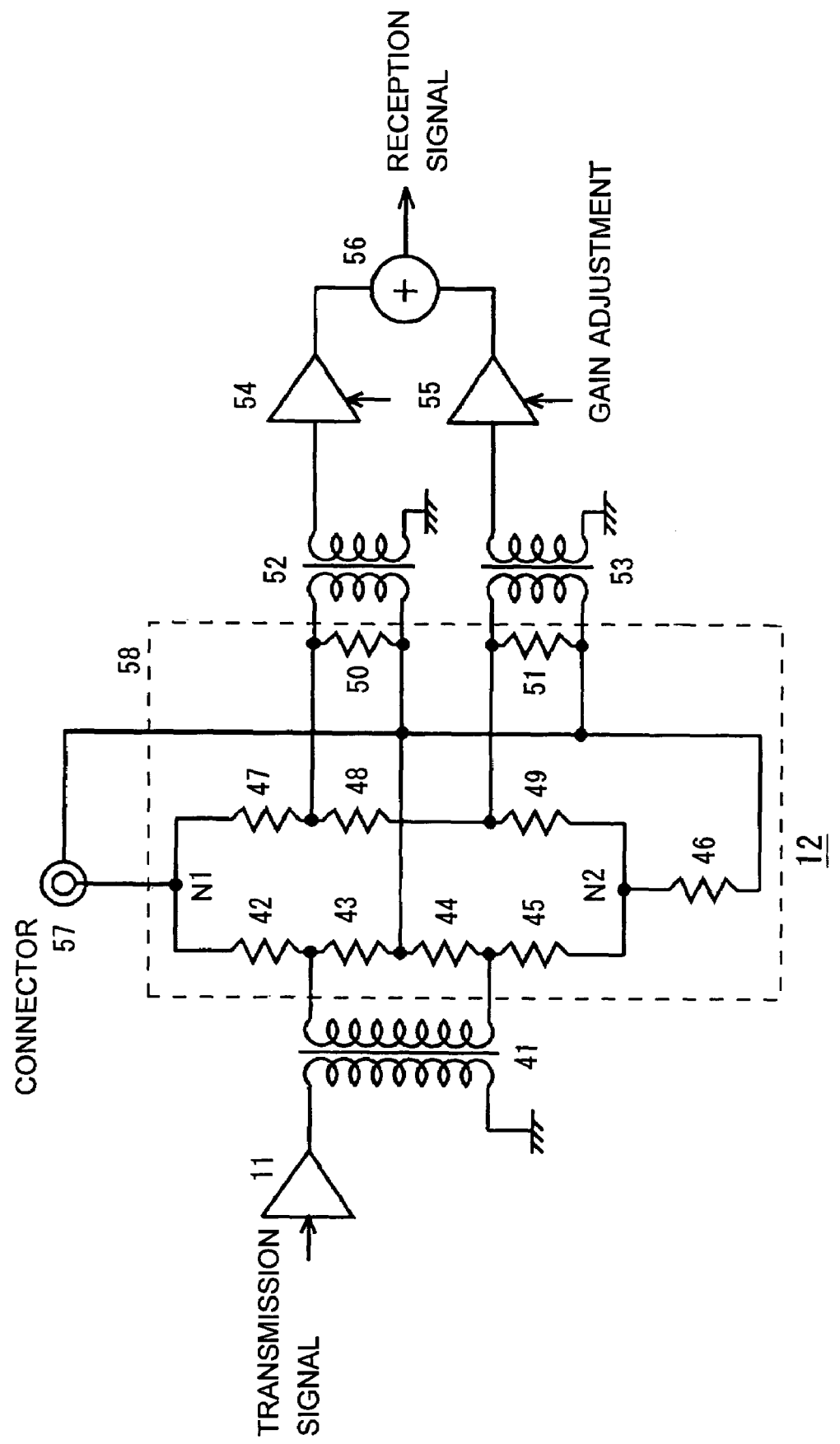
[FIG. 4] Circuit diagram showing the configuration of a hybrid circuit 12 of the present invention.

FIG. 4 is a circuit diagram showing the configuration of the hybrid circuit 12 of the present invention. A connector 57 connected to the above-described cable 21 is connected to a resistor matrix circuit 58 composed of resistors 42 to 51. The resistor matrix circuit 58 is connected to high-frequency transformers 41, 52, and 53. The resistance of the resistor 46 is equal to the characteristic impedance of the cable 21, which is connected to the connector 57.

The output of the amplifier 11 is connected to the primary winding of the high-frequency transformer 41. The transmission signal is amplified by the amplifier 11, and then output to the high-frequency transformer 41. One end of the secondary winding of the high-frequency transformer 41 is connected to the connector 57 and the resistor 47 via the resistor 42. The other end of the secondary winding of the high-frequency transformer 41 is connected to the resisters 46 and 49 via the resistor 45. The transmission signal is fed in opposite phases (in the form of voltages of opposite polarities) to the node (called node N1) where the connector 57, the resistor 42, and the resistor 47 are connected together and the node (called node N2) where the resistor 46, the resistor 45, and the resistor 49 are connected together, respectively.

The resistor 47 is connected to the primary winding of the high-frequency transformer 52, and the resistor 49 is connected to the primary winding of the high-frequency transformer 53. Therefore, the components of the transmission signal appear in opposite phases from the secondary windings of the high-frequency transformers 52 and 53.

The reception signal from the connector 57 is fed to the primary winding of the high-frequency transformer 52 via the resistor 47, and is fed to the primary winding of the high-frequency transformer 53 via the resistors 47 and 48. Therefore, the components of the reception signal appear in the phase (in the form of voltages of the same polarity) from the secondary windings of the high-frequency transformers 52 and 53.

The secondary windings of the high-frequency transformers 52 and 53 are connected to amplifiers 54 and 55, respectively. The outputs of the amplifiers 54 and 55 are mixed through addition, whereby the reception signal is obtained. At this time, the components of the transmission signal are mixed in opposite phases, whereby the reception signal is separated from the transmission signal. The resistors 43, 44, 50, and 51 are used for impedance matching.

Because of variations in the characteristic impedance of the cable 21 and the resistance of the resistor 46, the magnitudes of the opposite-phase components of the transmission signal output from the amplifiers 54 and 55 are not necessarily the same. In view of this, through adjustment of the amplification factors of the amplifiers 54 and 55, the components of the transmission signal can be removed from the reception signal. The amplification factors are optimized by means of the adjustment control circuit 18 in accordance with a genetic algorithm.

As described above, the characteristic feature of the hybrid circuit 12 of the present invention resides in that the amplifiers 54 and 55 provide two signal paths, and the balance between the signals output from the two signal paths is adjusted.

Figure 5:
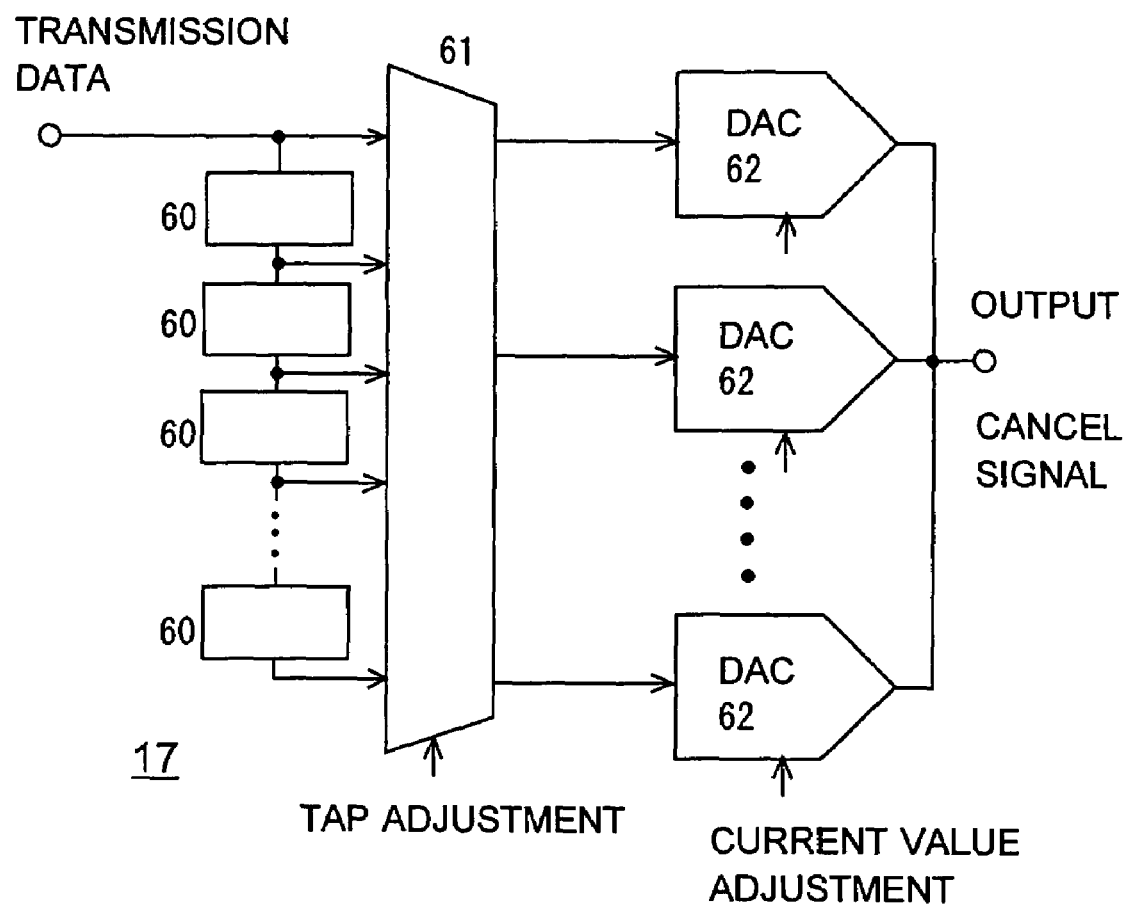
[FIG. 5] Block diagram showing the configuration of a cancel signal generation circuit of the present invention.

FIG. 5 is a block diagram showing the configuration of the cancel signal generation circuit 17 of the present invention. Transmission data are input to shift registers 60 connected in cascade, whereby the transmission data are successively and temporarily stored in shift registers 60. The outputs of the shift registers are fed to a selector 61, which selects a portion of the record of the transmission data. The outputs of the selector 61 are converted to analog currents by means of a plurality of D/A converters 62. All the outputs of the D/A converters 62 are connected in parallel so as to mix the currents through addition, to thereby generate a cancel signal. The selector 61 (tap position) and the currents (polarities and amplitudes) output from the DAC 62 are adjusted by means of the adjustment control circuit 18.

Figure 6:
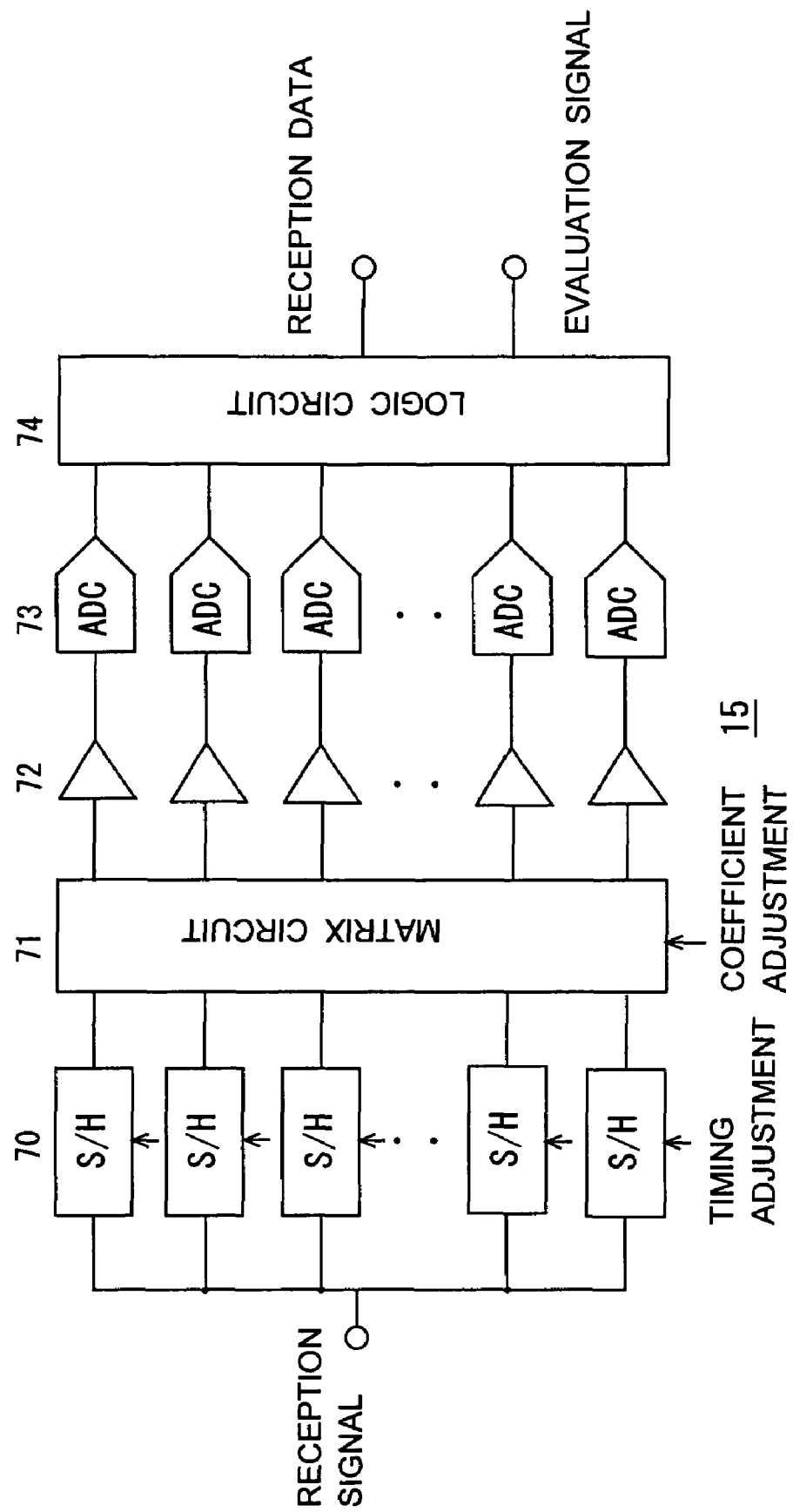
[FIG. 6] Block diagram showing the configuration of a receiving circuit 15 of the present invention.

FIG. 6 is a block diagram showing the configuration of a receiving circuit 15 of the present invention. In the receiving circuit 15, the output signal of the mixer 14 is sampled by means of a plurality of sample-hold (S/H) circuits 70. In order to cause a plurality of ADCs 73 to effect parallel operation in sequence, the S/H circuits 70 operate in sequence, one at a time, at timings determined on the basis of the clock signal. The timings are adjusted by means of the adjustment control circuit 18. In order to remove distortion, signals output from the S/H circuits 70 are subjected to analog sum-of-product computation performed by a matrix circuit 71.

Figure 11:
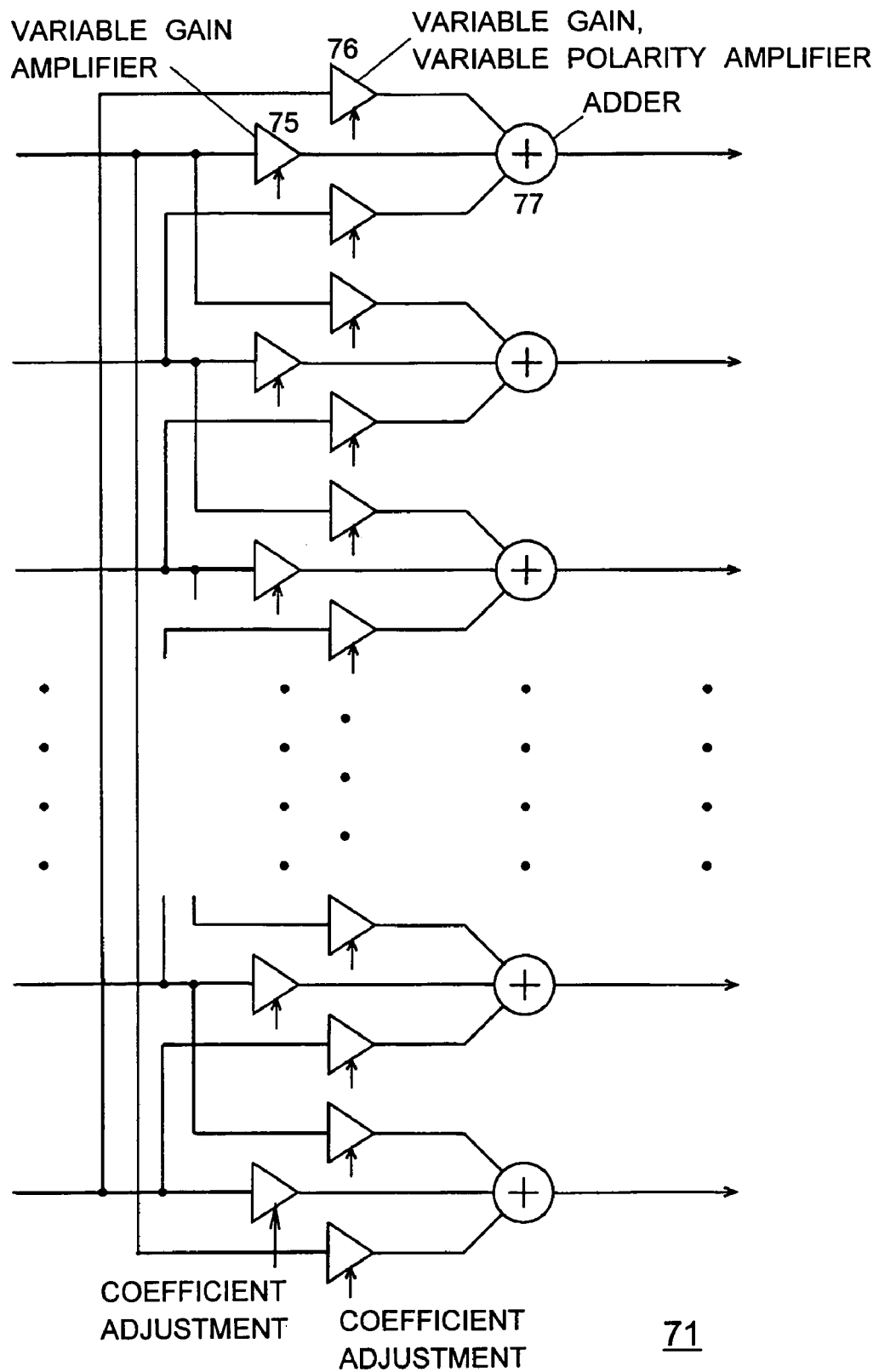
[FIG. 11] Block diagram showing the configuration of a matrix circuit of the present invention.

FIG. 11 is a block diagram showing the configuration of the matrix circuit 71 of the present invention. A signal output from one variable gain amplifier 75 and signals output from two variable gain, variable polarity amplifiers 76 are added by means of an analog adder 77, and a signal obtained as a result of addition is output. The gain and polarity of each amplifier are adjusted by means of the adjustment control circuit 18.

The outputs of the matrix circuit 71 are amplified by a plurality of amplifiers 72 to a level suitable for analog to digital conversion. The amplified outputs are converted to digital signals by means of the analog digital converters 73. In the case where distortion of the waveforms of the reception signal is small, the matrix circuit 71 may be omitted. In this case, the outputs of the S/H circuits 70 are connected directly to the amplifiers 72. The digital signals output from the analog digital converters 73 are collectively subjected to processing such as parallel-serial conversion in a logic circuit 74, whereby reception data and an evaluation signal are obtained.

Figure 12:
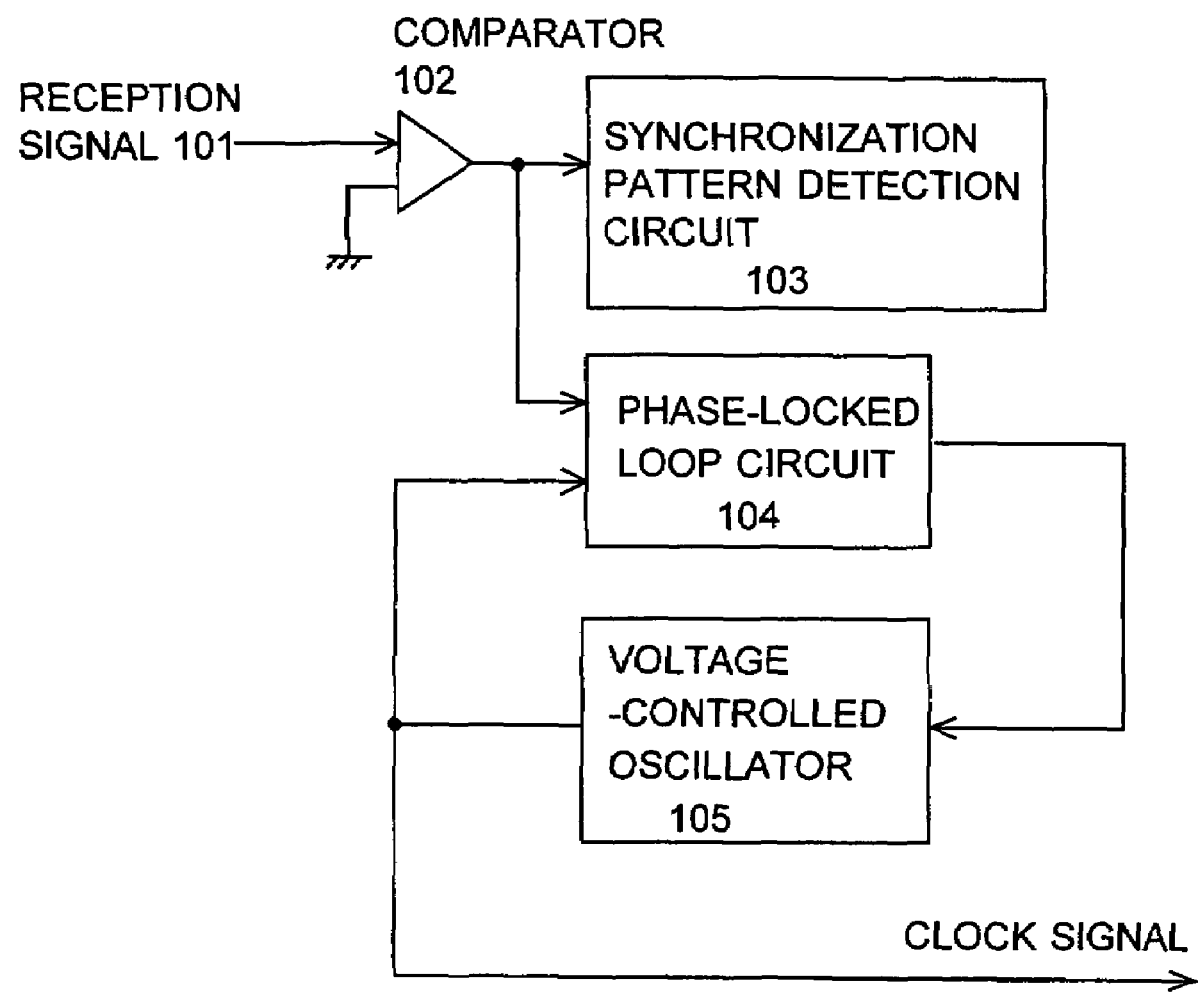
[FIG. 12] Block diagram showing a main portion of a clock regeneration circuit of the present invention.

FIG. 12 is a block diagram showing a main portion of the clock regeneration circuit of the present invention. In order to reproduce reception data from the reception signal, a clock signal corresponding to the received data must be regenerated. In the case of multilevel signals, clock regeneration is difficult. However, through trial and error, the present inventor found that the clock regeneration circuit 16 operates well when a voltage-controlled variable crystal oscillation circuit is used as a voltage-controlled variable oscillator used in a phase-locked loop (PLL) circuit.

A reception signal 101 is converted to a binary signal by means of a comparator, and the binary signal is fed to a synchronous pattern detection circuit 103 and a PLL (phase-locked loop) circuit 104. The detection output of the synchronous pattern detection circuit is connected to an enable terminal of the PLL circuit 104. The output of the PLL circuit 104 is connected to a voltage-controlled oscillator 105. The output of the voltage-controlled oscillator 105 is output, as a clock signal, to the PLL circuit and to the outside. The PLL circuit 104 and the voltage-controlled oscillator 105 undergo synchronization pull-in control only during periods in which a synchronization pattern is detected, and enter in a free-run state in the remaining periods. Through use of a voltage-controlled variable crystal oscillation circuit for the voltage-controlled oscillator 105, stable synchronization of the clock signal becomes possible.

Figure 9:
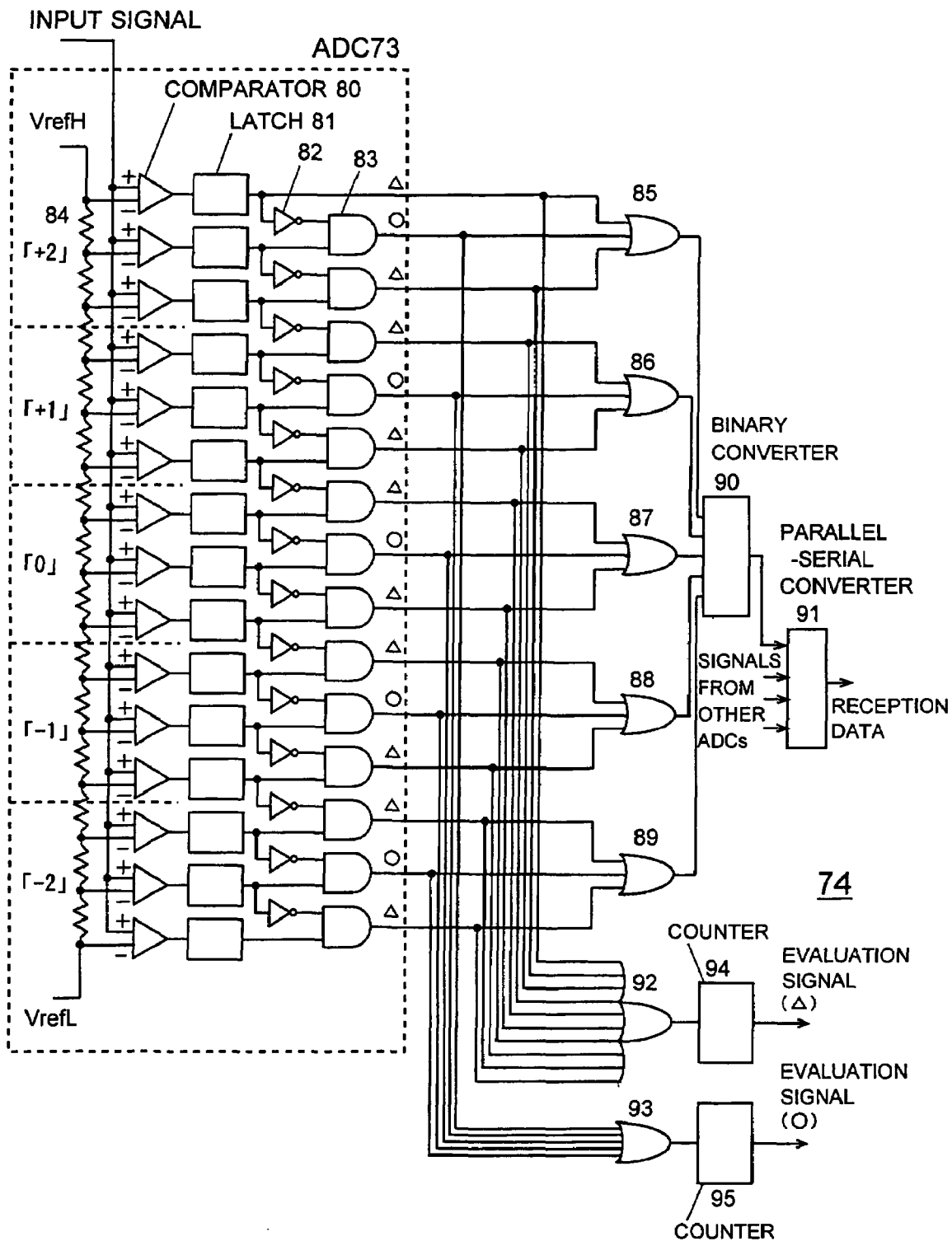
[FIG. 9] Block diagram showing the configuration of an evaluation-signal generating circuit of the present invention.

FIG. 9 is a block diagram showing the configuration of an evaluation-signal generating circuit of the present invention. FIG. 9 schematically shows the results of determination performed by the A/D converter 73 so as to determine digital values from the level of an analog signal. If a digital value, which is one of five values; i.e., "+2," "+1," "0," "−1," and "−2," can be determined from the level of the analog signal, digital data can be obtained. The error rate of the received multilevel analog signal changes as follows. The closer the level of the signal to the center of a determination range for the corresponding level, the lower the error rate; and the closer the level of the signal to the upper or lower threshold of the determination range, the higher the error rate. In view of the above, the determination range for each of five values is divided into subranges so as to distinguish the case where the level of the analog signal is near the center of the corresponding determination range from the case where the level of the analog signal is near the threshold thereof, which is the boundary of the determination range.

The input signal is input to the "+" terminal of each comparator 80, and a threshold voltage to be compared with the input signal is input to the "−" terminal of each comparator 80. Three comparators 80 are provided for each of multilevel determination ranges. The three comparators 80 for each determination range are applied with voltages (threshold voltages) which correspond to the lower limit level, a level one-third (of the determination range) higher than the lower limit level, and a level two-thirds higher than the lower limit level (one-third lower than the upper limit level), respectively. Only comparators which have determined that the corresponding threshold signal is lower than the input signal output "1," which is stored in a corresponding latch 81.

Since one input of each AND gate 83 is connected with the output of a latch on the upper row via a NOT gate 82, only when the output of the upper row latch is "1," the output of the AND gate 83 becomes "0." As a result, only the AND gate 83 which corresponds to the threshold value which is lower than the input signal and closest thereto outputs "1." In FIG. 9, a determination output signal marked with "○" represents that the level of the analog signal is in the vicinity of the center of the corresponding determination range; and a determination output signal marked with "Δ" represents that the level of the analog signal is in the vicinity of the corresponding threshold. OR gates 85 to 89 each calculate a logical sum of outputs of AND gates belonging to each of the multilevel determination ranges, to thereby output multilevel data. A binary converter 90 converts the multilevel data to binary data.

In a predetermined period, the number of determination "○" output signals and the number of determination "Δ" output signals in the A/D converter 73 are counted by use of OR gates 92 and 93 and histogram counters 94 and 95, and histogram data, representing frequencies, are output. The histogram data are output to the adjustment control circuit 18 as an evaluation signal.

Through use of a genetic algorism, the adjustment control circuit 18 adjusts the amplification factors of the amplifiers 54 and 55 in the hybrid circuit 12, the output waveform of the cancel signal generation circuit 17, the coefficients of the analog sum-of-product computation at the matrix circuit 71, etc. Further, the adjustment control circuit 18 transmits to the counterpart apparatus adjustment parameters regarding the transmitting circuit of the counterpart apparatus, and adjusts the level parameters, etc. of the preemphasis circuit of the transmitting circuit of the counterpart apparatus.

Next, a method of adjusting the circuit by use of a genetic algorism will be described. Notably, an example reference regarding a genetic algorism is "Genetic Algorithms in Search, Optimization, and Machine Learning" written by David E. Goldberg and published in 1989 by ADDISON-WESLEY PUBLISHING COMPANY, INC. Notably, the term "genetic algorithm" used herein refers to an evolutionary computation method, including an evolutionary programming (EP) method. An example reference regarding evolutionary programming is "Evolutionary Computation: Toward a New Philosophy of Machine Intelligence" written by D. B. Fogel and published in 1995 by IEEE Press.

The length of the cable 21 connected to the transmission apparatus 1, the position of an intermediate connection point, characteristic impedance, frequency characteristic, etc. change, for example, upon replacement of the cable. Therefore, the waveform of the transmission signal generated in the transmitting circuit 10, the output waveform of the cancel signal generation circuit 17, the amplification factors of the amplifiers 54 and 55 in the hybrid circuit 12, the coefficients of the analog sum-of-product computation at the matrix circuit 71, etc. must be optimally adjusted in accordance with the characteristics of the cable 21. The genetic algorithm is particularly suitable for this adjustment. Since a specific adjustment procedure is described in detail in Japanese Patent Application Laid-Open (kokai) No. 2000-156627 ("Electronic Circuit and Method of Adjusting the Same"), its outline will be described here.

In the adjustment procedure, first, at the time of startup of the apparatus, low-speed data communication is established between transmitting receiving circuits by use of a protocol which enables communications in an unadjusted condition; e.g., through decreasing the number of signal levels or the transmission speed. Subsequently, the transmitting side is caused to send a training signal, and an evaluation signal is obtained on the receiving side. On the basis of the evaluation signal, the adjustment control circuit 18 adjusts the receiving circuit by use of a genetic algorithm. Further, via a low-speed data communication channel, the adjustment control circuit 18 transmits to the counterpart apparatus adjustment parameters of the transmitting circuit of the counterpart apparatus, to thereby adjust the transmitting circuit of the counterpart apparatus. After adjustment has been performed within a relatively wide adjustment range through this training processing, high-speed data communication is established between the transmission apparatuses. After that, while actual data transmission is being performed, on-line fine adjustment is performed such that the transmission apparatuses are maintained in optimal conditions. The range of adjustment during transmission is limited to a narrow range around the favorable point attained through the immediately previous adjustment, so as not to impose a large influence on the quality of communications between the transmission apparatuses. During the on-line adjustment, the evaluation function of the genetic algorithm utilizes the results of signal determination in the A/D converter 73 (evaluation signal).

Figure 10:
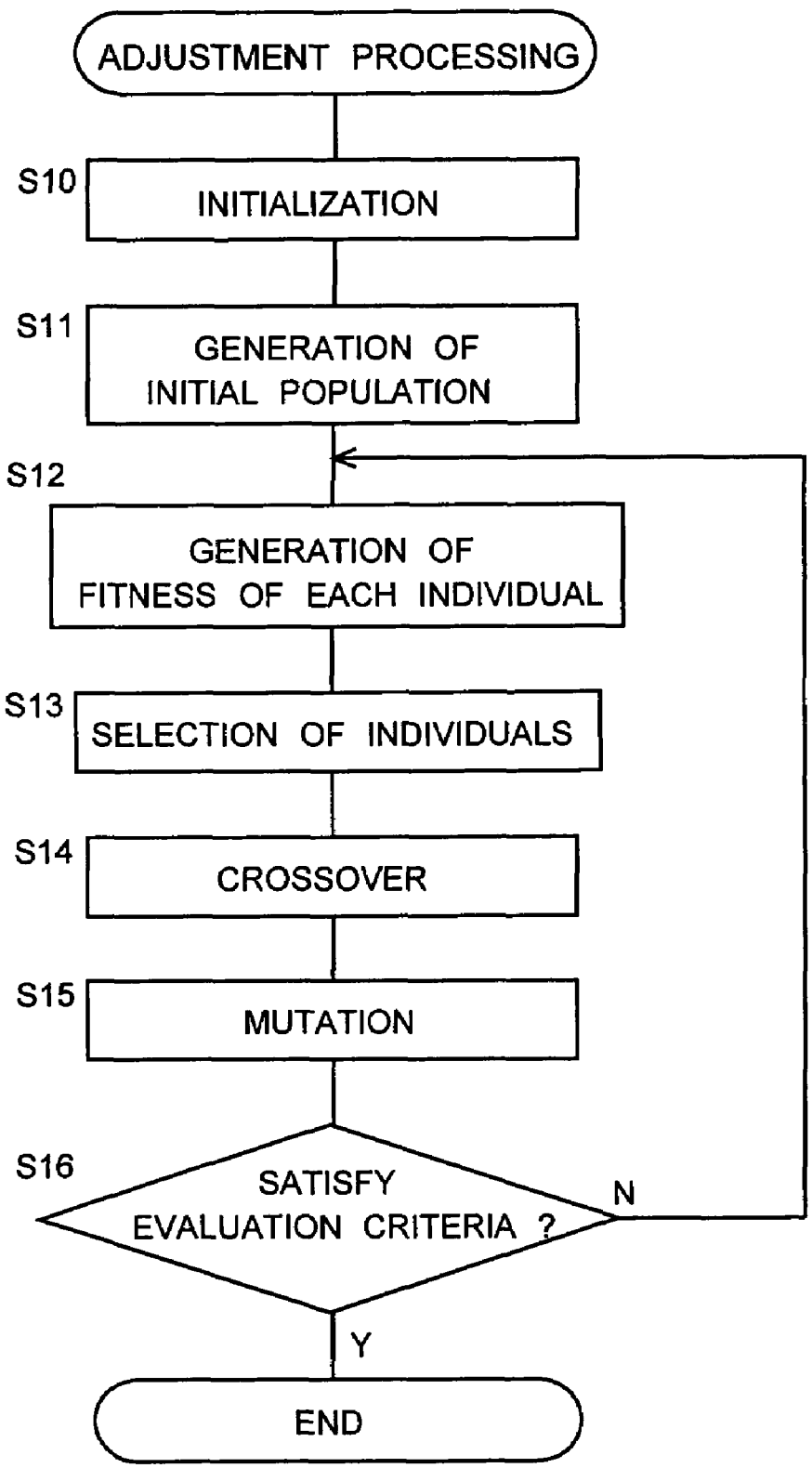
[FIG. 10] Flowchart showing the contents of adjustment processing of the present invention.

FIG. 10 is a flowchart showing the outline of adjustment processing of the present invention. In S10, initialization is performed. In S11, genes of individuals of an initial population are generated, centering on a site having a high evaluation value. In the present embodiment, the register values of registers which store adjustment values are directly used as chromosomes of the genetic algorithm. In S12, a fitness of each individual is generated. That is, for each individual whose evaluation value has not yet been measured, adjustment values of the individual are set to the circuit, a signal is transmitted for a predetermined period of time, and the above-mentioned evaluation signal is obtained. The evaluation function value F of the genetic algorithm is calculated by the following equation, for example.

$$F = (\text{the number of } ○)/((\text{the number of } ○) + (\text{the number of } Δ))$$

Here, the number of ○ is the count value of the histogram counter 95 at the end of the predetermined period, and the number of Δ is the count value of the histogram counter 94 at the end of the predetermined period. In S13, selection of individuals is performed. That is, individuals are sorted in the order of their evaluation values, and a predetermined number of individuals at the bottom are removed. In S14, gene crossover is effected. Specifically, a predetermined number of pairs of individuals are randomly selected (copied), and their chromosomes are exchanged so as to produce offspring genes.

In S15, mutation is effected where a predetermined number of individuals are randomly selected (copied), and their genes are modified so as to generate a new individual. In S16, determination as to whether or not the evaluation criteria are satisfied; i.e., whether or not the best evaluation function value F is equal to or grater than the predetermined value, is performed. When the evaluation criteria are satisfied, the processing is ended. When the evaluation criteria are not satisfied, the processing is repeated after returning to S12. When the processing is ended, the individual having the highest fitness among the biological population at that time is considered the solution of the optimization problem to be obtained. In the above-described manner, the transmission apparatus is automatically adjusted on line such that consistent communication quality is attained.

The invention claimed is:

1. A digital data transmission apparatus of a multilevel transmission scheme, comprising:
    transmitting means including an adjustable preemphasis circuit;
    receiving means including evaluation-signal generation means for generating an evaluation signal regarding an adjusted condition from a received signal;
    adjustment means for adjusting the receiving means or transmitting means of a counterpart apparatus by use of the evaluation signal; and
    a hybrid circuit which can perform balance adjustment by means of a resistor matrix circuit, wherein
    the receiving means further includes an adjustable echo cancel circuit.

2. A digital data transmission apparatus of a multilevel transmission scheme, comprising:
    transmitting means including an adjustable preemphasis circuit;
    receiving means including evaluation-signal generation means for generating an evaluation signal regarding an adjusted condition from a received signal; and
    adjustment means for adjusting the receiving means or transmitting means of a counterpart apparatus by use of the evaluation signal, wherein
    the evaluation-signal generation means is configured to determine whether the level of the received signal is in the vicinity of the center of a corresponding one of determination ranges corresponding to multi levels or in the vicinity of a boundary thereof and output histogram information representing its frequency; and
    the adjustment means adjusts a preemphasis circuit of the counterpart apparatus.

3. A digital data transmission apparatus of a multilevel transmission scheme, comprising:
    transmitting means including an adjustable preemphasis circuit;
    receiving means including evaluation-signal generation means for generating an evaluation signal regarding an adjusted condition from a received signal; and
    adjustment means for adjusting the receiving means or transmitting means of a counterpart apparatus by use of the evaluation signal, wherein
    the adjustment means adjusts respective circuits by means of a genetic algorithm.

4. A digital data transmission apparatus of a multilevel transmission scheme, comprising:
    transmitting means including an adjustable preemphasis circuit;
    receiving means including evaluation-signal generation means for generating an evaluation signal regarding an adjusted condition from a received signal; and
    adjustment means for adjusting the receiving means or transmitting means of a counterpart apparatus by use of the evaluation signal, wherein
    the receiving means further includes an adjustable distortion elimination circuit which performs analog processing for the received signal.

5. A digital data transmission apparatus of a multilevel transmission scheme, comprising:
    transmitting means including an adjustable preemphasis circuit;
    receiving means including evaluation-signal generation means for generating an evaluation signal regarding an adjusted condition from a received signal; and
    adjustment means for adjusting the receiving means or transmitting means of a counterpart apparatus by use of the evaluation signal, wherein
    the receiving means further includes a clock regeneration circuit in which a voltage-controlled variable crystal oscillation circuit is used as a voltage-controlled oscillator of a phase-locked loop circuit.

* * * * *